W. SHAW.
Bark-Reducing Machine.
No. 221,870. Patented Nov. 18, 1879.
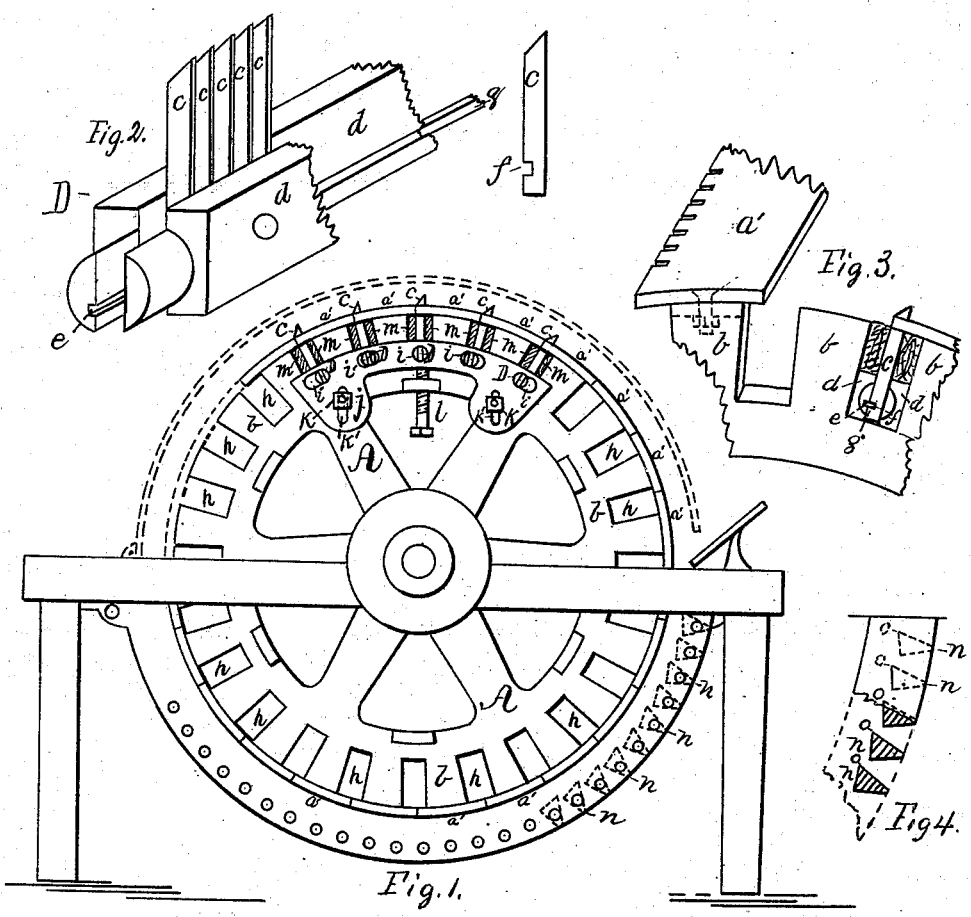

UNITED STATES PATENT OFFICE.

WILLIAM SHAW, OF KINGMAN, MAINE.

IMPROVEMENT IN BARK-REDUCING MACHINES.

Specification forming part of Letters Patent No. 221,870, dated November 18, 1879; application filed May 15, 1879.

*To all whom it may concern:*

Be it known that I, WILLIAM SHAW, of Kingman, in the county of Penobscot and State of Maine, have invented certain new and useful Improvements in Bark-Reducing Machines; and I do hereby declare that the following is a full, clear, and exact description of the invention, that will enable others skilled in the art to which it appertains to make and use the same, reference being had to the accompanying drawings, forming a part of this specification, in which—

Figure 1 shows a side elevation of my invention; Fig. 2, detail of knife-holding bar D; Fig. 3, end view of same in place, together with lag; Fig. 4, detail of rests $n$.

Same letters show like parts.

My invention relates to certain improvements in that class of machines for cutting or reducing bark which employ a rotating cutting-cylinder; and it consists of improvements in the means for securing the knives or cutters, making the same adjustable and compensating for wear, and in the employment of a series of bars to hold the bark while being operated on by the cutters, enabling the latter to act through a considerable segment of a circle instead of at one point only, as common in this class of machines.

It will be readily understood by reference to the accompanying drawings, in which A shows the cutting or reducing cylinder, supported in a suitable frame, and provided with appropriate devices for communicating a rotary motion thereto. This cylinder is formed of lags $a'$ $a'$, bolted to the heads $b$ $b$, which lags are slotted at one side to allow the knives $c$ to project. The lower ends of these knives are secured between two bars, $d$ $d$, one of which is grooved for its entire length, a corresponding groove, $f$, being made in the series of knives, the groove in the bar being shown at $e$. The bars $d$ $d$ are held together by bolts or screws, and a spline, $g$, passing through the grooves $e$ $f$, keeps the knives firmly held between the bars, which, together with the spline, form a knife-holding bar, D.

The heads $b$ $b$ of the cutting-cylinder are provided with slots $h$ $h$ around the periphery, open at the circumference. The series of knives being arranged and set in the holding-bar D and in the slots of the lags, the latter are bolted in place on the heads $b$ $b$, and the knives are supported in proper position, the holding-bars D being first placed in the slots $h$, before mentioned. The ends of the bars D project beyond the heads $b$ $b$ on each side, and these projecting ends are turned rounding, and are inserted in openings $i$ in segmental plates $j$, attached to each head $b$ $b$ by bolts $k$ $k$, passing through inclined slots $k'$ $k'$ in the plates $j$.

A set-screw, $l$, at the center of the segment operates to adjust it toward the circumference of the cutting-cylinder, carrying the knife-bars D with it, and regulating the projection of the knives from its surface. The openings $i$ in the plate $j$ receiving the ends of the bars D, with the exception of the center opening, consist of slots to compensate for the increased size of the circle as the segment is moved toward the circumference.

Each pair of segmental plates carries a series of bars, five being the most convenient number; and the knives consist of rectangular bars of steel, their ends being brought to a point.

It will be observed that when the segmental plates $j$ are set at any point below the lags $a'$ $a'$ an opening is left between the knife-bar D and the under surface of the lags on each side of the knives. This opening is filled by strips of wood $m$, extending entirely across the cylinder at front and back of the series of knives, serving the double purpose of keeping out the dust which would otherwise work through the slots in the lags through which the knives project and as a support for the knives above the knife-bar D.

It is evident that the adjusting devices of the segmental plate $j$ may be varied by using a set-screw at each end and a radial slot in the middle for the retaining-bolt.

In machines of this class it is common to employ a single bar or guard at the point where the bark is presented to the cutters for it to rest upon while the knives act. My improvement consists in the employment of a series of such bars, arranged concentrically around the lower part of the cutting-drum. These are shown in Fig. 4, at $n$. The edge $o$ of each bar projects slightly beyond the one immediately next to it, forming a ledge for the bark to rest on as the knives pass it. These bars are set close to the points of the knives, which latter, as they wear away, may be re-adjusted by the means before described.

The ordinary casings are employed in my machine, and the bark may be fed to the cutters in any known and appropriate manner.

A space of about an eighth of an inch only is left between the bars $n$ and the points of the cutters, and the bars are also set about that distance from each other.

What I claim as my invention, and desire to secure by Letters Patent, is—

1. In a bark-reducing machine, the cutting-knives $c$, arranged in rows or series in knife-holding bars D, said knives projecting through slots in the face of the cylinder, and being radially adjustable by set-screws or similar devices acting on said bars at each end, substantially as and for the purposes specified.

2. In a bark-reducing machine, the combination of bars $d\ d$, secured together and having a groove at $e$, with a series of knives grooved at $f$, and secured in position in said bars by a spline, $g$, as and for the purposes specified.

3. In a bark-reducing machine, the segmental plates $j$, adjustable radially upon the heads $b\ b$ of the cylinder, in combination with a series of knife-holding bars, D, secured in slots $i$ in said plates, as described, substantially as and for the purposes set forth.

4. In a bark-reducing machine, the combination of a row or series of knives or cutters, $c$, supported in a knife-holding bar, D, secured in slots $h\ h$ in the heads of the cylinder $a$, with the strips or slats $m$, passing across the cylinder and supporting the knives at front and back, as specified.

5. In a bark-reducing machine, in combination with a cutting-cylinder, $a$, provided with cutting-knives $c$ upon its circumference, a series of bars, $n$, arranged concentrically with the cutting-cylinder, the edge of each bar projecting, as shown at $o$, and the bars being set with a space between them, substantially as and for the purposes described.

In testimony that I claim the foregoing I have hereunto set my hand this 6th day of May, 1879.

WILLIAM SHAW.

Witnesses:
JOHN R. MASON,
WM. FRANKLIN SEAVEY.